(No Model.)
M. STEHLE.
STOVEPIPE JOINT.
No. 527,380. Patented Oct. 9, 1894.
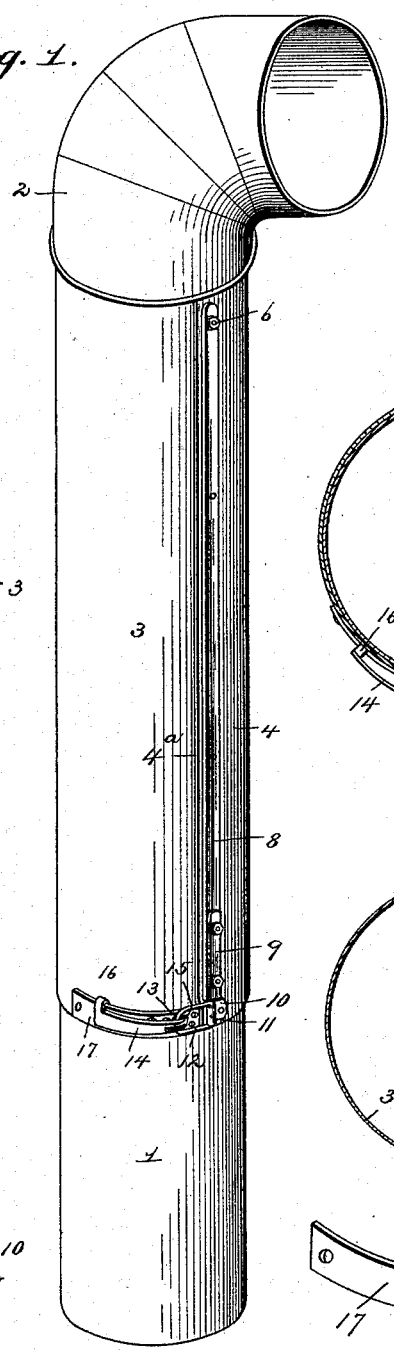
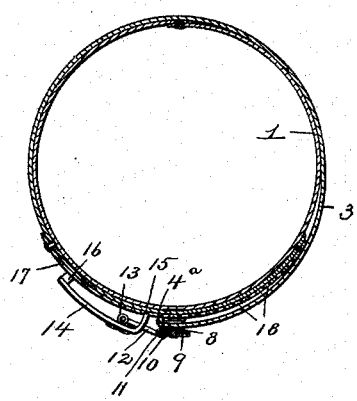
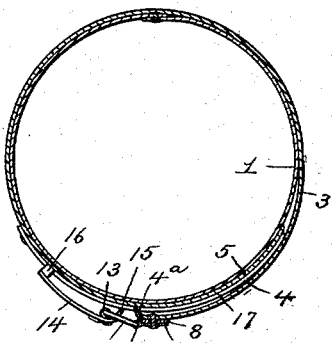
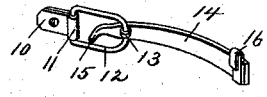
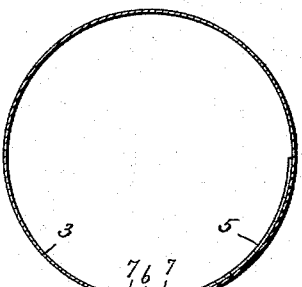
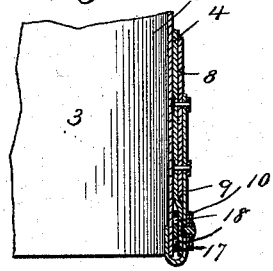
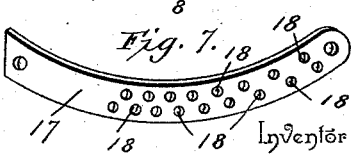
Witnesses
Harry L. Amer
J. B. Deneux
Inventor
Martin Stehle
By his Attorneys,
C. A. Snow & Co.
THE NORRIS PETERS CO., PHOTO-LITHO., WASHINGTON, D. C.

UNITED STATES PATENT OFFICE.

MARTIN STEHLE, OF PERRY, MISSOURI.

STOVEPIPE-JOINT.

SPECIFICATION forming part of Letters Patent No. 527,380, dated October 9, 1894.

Application filed May 29, 1894. Serial No. 512,919. (No model.)

*To all whom it may concern:*

Be it known that I, MARTIN STEHLE, a citizen of the United States, residing at Perry, in the county of Ralls and State of Missouri, have invented a new and useful Stovepipe-Joint, of which the following is a specification.

My invention relates to an improvement whereby it is possible to connect one section of a pipe to another irrespective of the differences which may exist in their sizes. This end I attain by forming one section with a longitudinal slit therein and by allowing the edges caused by said slit to overlap, whereby the diameter of one end of the pipe may be regulated, and by providing such end with a clamp for securing it in place.

In the drawings: Figure 1 represents a perspective view of a pipe joint constructed after the manner of my invention; Fig. 2, a cross-section of the pipe; Fig. 3, a detail perspective of the clamp; Fig. 4, a cross-section taken above the line of Fig. 2; Fig. 5, a detail sectional view illustrating the construction at the upper end of the pipe-section; Fig. 6, a similar view illustrating the construction at the lower end of the section; Fig. 7, a detail perspective view of the perforated strip for holding the parts together.

The reference numeral 1 indicates the lower pipe, or that one to which the second section 2 is to be joined, and 3 the joint section or that device by which the joining is effected and in which my invention lies. This consists of a sheet of tin or other sheet metal bent into an approximately cylindrical form, and having the straight edge 4 and diagonal or bias edge 5, the latter edge being arranged under the former and thereby forming a triangular wing which will permit the movement of the edges of the section so as to enlarge one end of the cylinder, and at the same time prevent the separation of its edges. The upper ends of the edges 4 and 5 are pivotally joined to each other by the removable rivet or bolt 6, and this is made removable in order that it may be placed in any of the openings 7. These openings 7 are horizontally aligned and preferably three in number, and by their means the size of the upper end of the section 3 may be changed to suit the size of the pipe 2. The edge 4 is formed with the downwardly-extending bend or lip $4^a$, which bears against the wing of edge 5, and operates to make a smoke-tight joint irrespective of the movements of the edges.

Riveted to the edge $4^a$, and extending to a point above its lower end, is the section of strap or hook iron 8, which operates to give stiffness and rigidity to the edge, as will hereinafter appear.

Rigidly secured to the lower end of the strip of iron 8 is the auxiliary or supplemental strip 9, which proceeds downwardly and bends under the lower edges of the meeting ends of the section and thence up parallel with the wing portion of the edge 5. By this means the two edges are allowed independent movement, and held with security from movement other than that necessary to the operation of the device.

Riveted to the strip 9 is the metallic plate 10, which is bent double to form the eye or journal 11, in which the straight portion of the ring 12 is adapted to lie, and to be capable of swinging therein.

Fulcrumed to the ring 12, by means of the clip 13, is the lever 14, which has its short arm arranged on the right of its fulcrum and curved downwardly and outwardly to form the spur 15, while its remaining, or the long, arm is extended outwardly and provided with the hook 16. By means of this hook the lever may be secured in position, as will be better described hereinafter.

Rigidly secured, by rivets or otherwise, to the lower end of the section 3, and extending from the edge 5 to a point nearly one-half the circumferential length of the section, is the strip of sheet iron 17. This device is provided with the perforations 18, which extend for very nearly the entire length of the strip and are arranged in two horizontal rows and so that no two perforations will be vertically aligned. This arrangement will place them diagonally and is so organized in order that the lever 14 may engage every point on the strip. The perforations 18 are provided to permit the connection of the lever 14 and strip 17, and this is effected by fitting the spur 15 into one of the perforations and swinging the lever to the left, which will draw the edges together and permit the hook 16 to pass under the strip 17, and thereby lock the lever in place.

In the use of my invention the upper end of the section 3 is connected to the pipe 2, and the lower end of the section adjusted to the size of such pipe. The edges 4 and 5 are now drawn together as far as possible and the lever 14 moved to the right so that the spur 15 will be in position to engage one of the perforations 18, whereupon the lever should be turned back so as to lie parallel with the strip 17, and so that the hook 16 may be passed thereunder. This will result in a tightening of the section and in clamping it against the pipe 1. If the pipe 2 is the larger, the section 3 may, of course, be reversed, with the same result.

Having described my invention, what I claim is—

1. A pipe joint consisting of a section of sheet metal bent into a cylindrical form and having its contiguous edges overlapping, whereby it may be adjusted to suit the size of the pipe with which it is used, a perforated plate on one edge, a ring pivoted to the remaining edge, and a lever fulcrumed to the ring and provided at one end with a reduced or pointed portion and at the remaining end with a hook, the first end being adapted to pass into engagement with the perforations of said plate while the hook of the remaining end is adapted to take under the plate and to hold the lever in place, substantially as described.

2. A pipe joint consisting of a sheet of metal bent into a cylindrical form and having its contiguous edges overlapping, a rivet at one end of said edges whereby the edges at said end are held in a fixed position, a strengthening strip riveted to the outer edge of the sheet of metal, a U-shaped strip rigidly secured to the lower end of said strengthening strip and projecting inwardly so as to embrace the two edges of the sheet of metal and to hold them in position, and a clasp for securing the said edges together, substantially as described.

In testimony that I claim the foregoing as my own I have hereto affixed my signature in the presence of two witnesses.

MARTIN STEHLE.

Witnesses:
S. B. SMITH,
J. W. NEVILLE.